US008804816B2

(12) United States Patent
Li et al.

(10) Patent No.: US 8,804,816 B2
(45) Date of Patent: Aug. 12, 2014

(54) VIDEO ENCODING ENHANCEMENTS (75) Inventors: Bin Li, Hefei (CN); Jizheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 13/221,489

(22) Filed: Aug. 30, 2011

(65) Prior Publication Data

US 2013/0051452 A1 Feb. 28, 2013

(51) Int. Cl.
H04N 7/26 (2006.01)

(52) U.S. Cl.
CPC ... *H04N 19/00072* (2013.01); *H04N 19/00212* (2013.01); *H04N 19/00884* (2013.01); *H04N 19/00551* (2013.01); *H04N 19/00969* (2013.01)
USPC ............ 375/240.01; 375/240.23; 375/240.24; 375/E7.026

(58) Field of Classification Search
None
See application file for complete search history.

(56) References Cited

U.S. PATENT DOCUMENTS

| 5,227,877 | A | 7/1993 | Yukitake | |
|---|---|---|---|---|
| 6,091,774 | A | 7/2000 | Hyodo et al. | |
| 2010/0080296 | A1* | 4/2010 | Lee et al. | 375/240.16 |
| 2011/0274158 | A1* | 11/2011 | Fu et al. | 375/240.02 |
| 2012/0051431 | A1* | 3/2012 | Chien et al. | 375/240.16 |
| 2012/0082210 | A1* | 4/2012 | Chien et al. | 375/240.02 |
| 2012/0114034 | A1* | 5/2012 | Huang et al. | 375/240.03 |
| 2012/0195366 | A1* | 8/2012 | Liu et al. | 375/240.02 |
| 2012/0230411 | A1* | 9/2012 | Liu et al. | 375/240.16 |
| 2012/0287999 | A1* | 11/2012 | Li et al. | 375/240.16 |
| 2013/0077687 | A1* | 3/2013 | Wang et al. | 375/240.15 |
| 2013/0271566 | A1* | 10/2013 | CHEN et al. | 348/43 |

OTHER PUBLICATIONS

Hang, et al., "Towards the Next Video Standard: High Efficiency Video Coding", Proceedings of the Second APSIPA Annual Summit and Conference, Dec. 2010, pp. 609-618.
Ma, et al., "Low Complexity Integer Transform and High Definition Coding", Proc. of SPIE the International Society for Optical Engineering—Applications of Digital Image Processing XXVII, vol. 5558, Aug. 2004, 8 pages.
Segall, et al., "Parallel Intra Prediction for Video Coding", 28th Picture Coding Symposium, PCS2010, Dec. 2010, pp. 310-313.
Uger, et al., "Low Complexity Video Coding and the Emerging HEVC Standard", 28th Picture Coding Symposium, PCS2010, Dec. 2010, pp. 474-477.
Zatt, et al., "GOP Structure Adaptive to the Video Content for Efficient H.264/AVC Encoding", Proceedings of 2010 EEE 17th International Conference on Image Processing, Sep. 2010, pp. 3053-3056.

* cited by examiner

*Primary Examiner* — Christopher S Kelley
*Assistant Examiner* — Kaitlin A Retallick
(74) *Attorney, Agent, or Firm* — Carole Boelitz; Micky Minhas; Lee & Hayes PLLC (57) ABSTRACT

Techniques for implementing video encoding enhancements may increase video encoding efficiency. One of the techniques may involve the use of an exception value and a maximum index value in inter-prediction coding lookup table to enhance the combined coding of an inter-prediction direction and a reference frame index for a coding unit. Another of the techniques may include adaptively ordering the encoding of a split flag value and a skip flag value for a coding unit. An additional technique may include providing a uniform approach to adaptively combined code the coded block flag (CBF) values for transform or coding units of images that are used with the Residue Quad-tree (RQT) information to represent residue information.

20 Claims, 7 Drawing Sheets

VIDEO ENCODING ENHANCEMENTS

BACKGROUND

Video encoders and decoders may be used to encode input video signals into digital data, or decode digital data into output video signals. Current video encoders may use techniques such as prediction, transform, quantization, and entropy encoding to reduce the complexity of the digital data that is being digitally encoded from input video signals. Prediction may be either intra-prediction or inter-prediction. Intra-prediction may include the use of pixels that surround a particular pixel in a frame to predict the data values of the particular pixel. In inter-prediction, the pixels in a particular frame may be predicted from pixel information in a prior frame (forward prediction), from pixel information in a subsequent frame (backward prediction), or from both the preceding frame and the subsequent frame (bi-direction prediction). Accordingly, when a block of pixel data in a frame is only predicted from other pixel values, the block may be designated as being in skip mode and no residue is signaled. Transform may make the energy of the residue (the difference between original signal and predicted signal) more concentrated. The output of the transform may be further quantized via quantization before entropy encoding is applied to the quantized values. Entropy encoding may involve a lossless data compression of the quantized values to generate the digital data that encodes the initial input video signals.

Video encoders that are used to encode input signals into digital signals may conform to various video compression standards. For example, high efficiency video coding (HEVC) is a video compression standard that may provide improved coding efficiency over previous video coding standards. The HEVC standard may include the implementation of content-adaptive binary arithmetic coding (CABAC) or content-adaptive variable length coding (CAVLC).

SUMMARY

Described herein are techniques for implementing improvements in video encoding. The techniques may enhance the efficiency of video encoding. First, the techniques may provide the use of an exception value and an implicit maximum index value to an inter-prediction coding lookup table to enhance the combined coding of inter-prediction direction and reference frame index. Second, the techniques may include adaptively ordering the encoding of a split flag value and a skip flag value for one or more coding units (CUs) in a frame of image to enhance coding efficiency. Third, the techniques may also include providing a uniform approach to adaptively combined code the coded block flag (CBF) values for transform units (TUs) of images, in which the CBF values are used with Residue Quad-tree (RQT) information to represent residue information, regardless of maximum transform depth. Such a uniform approach may improve CBF coding efficiency. The improvements in video encoding may be applicable to video encoders that conform to the high efficiency video coding (HEVC) standard, such as video encoders that perform content-adaptive variable length coding (CAVLC). However, the improvements in video encoding may also be applicable to video encoders that conform to other video encoding standards.

In various embodiments, the techniques may involve the use of an exception value and a maximum index value in an inter-prediction coding lookup table to enhance the combined coding of inter-prediction direction and reference frame index for a coding unit. The techniques may further include adaptively ordering the encoding of a split flag value and a skip flag value for a coding unit. An additional technique may include providing a uniform approach to adaptively combined code the coded block flag (CBF) values for transform or coding units of images that are used with the Residue Quad-tree (RQT) information to represent residue information.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to techniques for implementing video encoding enhancements. The techniques may enhance the efficiency of video encoding. The techniques may provide the use of an exception value and a maximum index value in an inter-prediction coding lookup table to enhance the combined coding of an inter-prediction direction and a reference frame index. The techniques may also include adaptively ordering the encoding of a split flag value and a skip flag value for one or more coding units (CUs) in a frame of image to enhance coding efficiency. The techniques may further include providing a uniform approach to adaptively combined code the coded block flag (CBF) values for transform units (TUs) of images that are used with the Residue Quad-tree (RQT) information to represent residue information, regardless of maximum transform depth to improve CBF coding efficiency. Combined coding, as used herein, refers to using a single value to represent a particular combination of multiple values, in which each of the multiple values represents a different piece of information. In this way, rather than encoding the multiple values separately as separate pieces of data, the multiple values may be more efficiently represented by a single encoded value.

By implementing such techniques, video encoders that conform to the high efficiency video coding (HEVC) standard, such as video encoders that perform content-adaptive variable length coding (CAVLC), may achieve greater efficiency in encoding video data from input video signals. However, the improvements in video encoding may also be applicable to video encoders that conform to other video encoding standards. Various examples of techniques for implementing the techniques for improved video encoding in accordance with the embodiments are described below with reference to FIGS. 1-7.

EXAMPLE SCHEME

Figure 1:
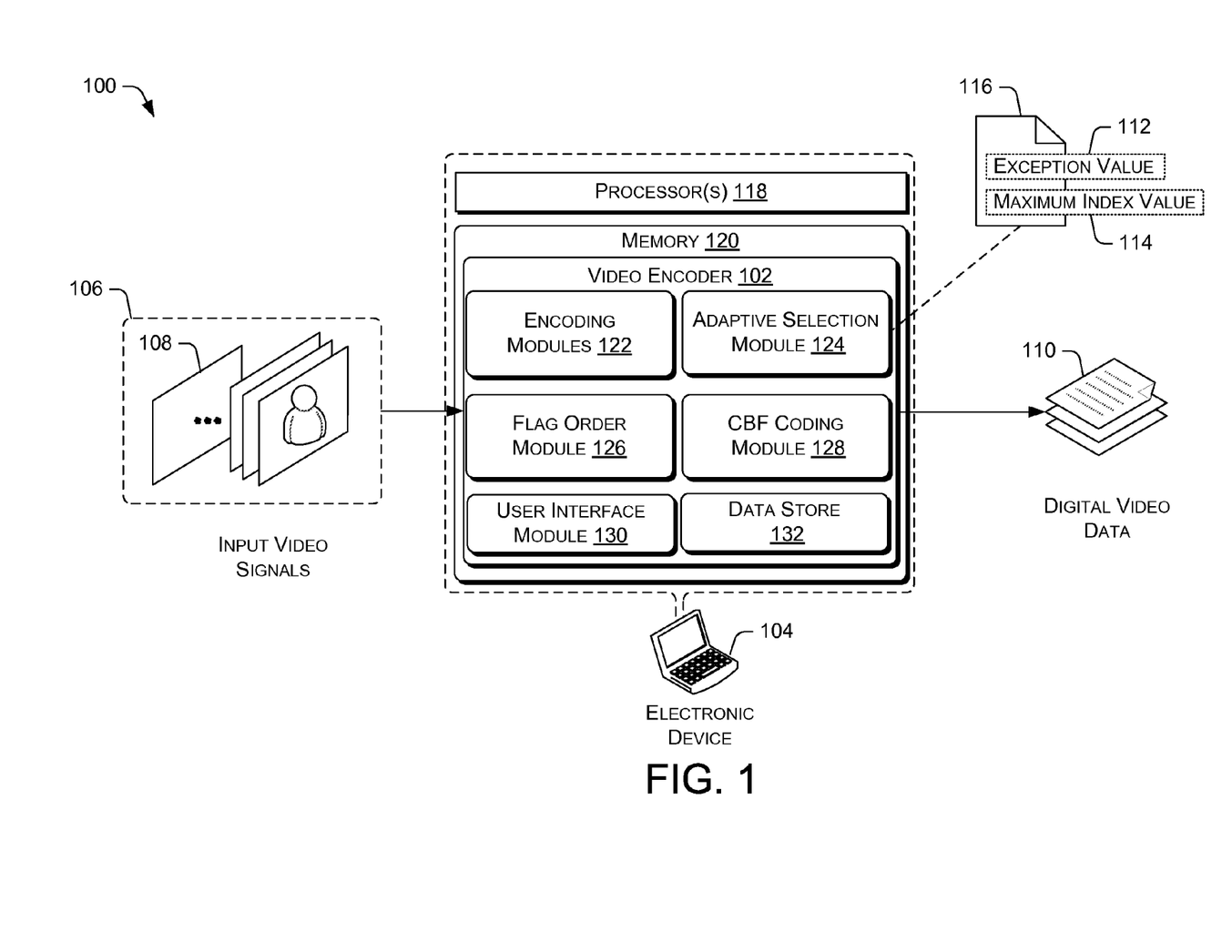
FIG. 1 is a block diagram that illustrates an example scheme that implements a new video encoder.

FIG. 1 is a block diagram that illustrates an example scheme 100 that implements an enhanced video encoder 102 that uses the improved video encoding techniques described herein. The video encoder 102 may be implemented on an electronic device 104. The video encoder 102 may process the input video signals 106 that includes frames 108 of video data into digital video data 110. The video encoder 102 may implement several techniques that improve the efficiency of video encoding during the conversion of the input video signals 106 into the digital video data 110. In various embodiments, the techniques may include using an exception value 112 and a maximum index value 114 with an inter-prediction coding lookup table 116 to enhance the combined coding of inter-prediction direction and reference frame index. The techniques may also include adaptively ordering the encoding of a split flag value and a skip flag value for one or more coding units (CUs) in a frame of image to enhance coding efficiency. The techniques may further include providing a uniform approach to adaptively combined code the coded block flag (CBF) values for TUs of images that are used with the Residue Quad-tree (RQT) information to represent residue information, regardless of maximum transform depth to improve CBF coding efficiency.

The electronic device 104 may be a general purpose computer, such as a desktop computer, a tablet computer, a laptop computer, a server, and so forth. However, in other embodiments, the electronic device 104 may be one of a smart phone, a game console, a personal digital assistant (PDA), and so forth.

The electronic device 104 may includes one or more processors 118, memory 120, and/or user controls that enable a user to interact with the electronic device. The memory 120 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The electronic device 104 may have network capabilities. For example, the electronic device 104 may exchange data with other electronic devices (e.g., laptops computers, servers, etc.) via one or more networks, such as the Internet. In some embodiments, the electronic device 104 may be substituted with a plurality of networked servers, such as servers in a cloud computing network.

The one or more processors 118 and the memory 120 of the electronic device 104 may implement the various components of the video encoder 102 that apply the techniques for improving video encoding efficiency. The components of the video encoder 102 may include one or more encoding modules 122, an adaptive selection module 124, a flag order module 126, a CBF coding module 128, a user interface module 130, and a data store 132. The modules may include routines, programs instructions, algorithms, objects, and/or data structures that perform particular tasks or implement particular abstract data types.

The encoding modules 122 may include components that convert the input video signals 106 into the digital video data 110. During the conversion, the encoding modules 122 may perform operations such as prediction, transform, quantization, entropy encoding, as well as other operations that facilitate the conversion. In some embodiments, operations performed by the encoding modules 122 may conform to the high efficiency video coding (HEVC) standard, include the content-adaptive variable length coding (CAVLC) component of the HEVC standard. In other embodiments, the encoding modules 122 may perform encoding operations that conform to other video encoding standards.

The adaptive selection module 124 may be employed by the one or more encoding modules 122 of the video encoder 102 to determine whether syntax elements associated with inter-prediction are to be combined encoded using the lookup table or encoded separately. The flag order module 126 may be employed by the one or more encoding modules 122 to determine the order that a split flag and a skip flag is to be encoded for each CU so that coding efficiency may be enhanced. The CBF coding module 128 may use a uniform approach to adaptively combined code the CBF values for TUs in images regardless of maximum transform depth. The operation of the encoding modules 122, the adaptive selection module 124, the flag order module 126, and the CBF coding module 128 in enhancing coding efficiency are further described below.

Improved Inter-Prediction Coding Lookup Table

During the encoding of input video signals, the video encoder 102 may combined code some syntax elements that are included in a CU, which may be a portion of a frame or an entire frame, to improve coding efficiency. Thus, when a block of pixels in a frame is being predicted from the pixel data in other frames, inter-prediction direction (e.g., forward prediction, backward prediction, or bi-prediction), and the one or more reference frame index values of the other frames that contributed image data may be encoded in combination to improve efficiency.

In one example, given lists of frames that includes a "list 0" of prior frames and a "list 1" of subsequent frames to a particular frame, forward prediction for the particular frame may be accomplished using pixel data in a frame from the "list 0". Backward prediction may be accomplished using pixel data in a frame from the "list 1", and bi-prediction may be accomplished using pixel data of frames from both the "list 0" and "list 1". Accordingly, a reference frame index may be provided to each list. Each reference frame index, which denotes the position of each frame in a corresponding list, may be labeled from the number "0" to a maximum reference frame number.

As such, suppose the "list 0" has m frames and the "list 1" has n frames, then there may be m possible frames in the "list 0" prediction, and n possible frames in the "list 1" prediction, and m*n possible frames in bi-prediction. Thus, if max (m, n)≤2, then there are a maximum of eight possible frames. In such a scenario, the video encoder 102 may encode the syntax elements of the digital video data 110 (e.g., frame) using coding definitions shown below in Table I, in which the value and meaning of each value is defined.

TABLE 1

Lookup Table Values and Definitions

| Value | Definition |
|---|---|
| 0 | List 0 prediction using reference frame 0 |
| 1 | List 0 prediction using reference frame 1 |
| 2 | List 1 prediction using reference frame 0 |
| 3 | List 1 prediction using reference frame 1 |
| 4 | Bi-prediction using reference frame (0, 0) |
| 5 | Bi-prediction using reference frame (0, 1) |
| 6 | Bi-prediction using reference frame (1, 0) |
| 7 | Bi-prediction using reference frame (1, 1) |

Further, according to the meanings of the values listed in Table 1, the video encoder 102 may implement a lookup table (e.g., lookup table 116) that includes the values {0, 2, 1, 4, 3, 6, 5, 7}, as established based on a probability of each value occurring during encoding. Further, when backward ("list 1") prediction is prohibited, the lookup table may be changed to {0, 1, 4, 6, 5, 7, 2, 3}, in which unused values (i.e., 2 and 3) are moved to the end of the lookup table. For example, backward prediction may be prohibited when "list 1" is identical to list "0". In various embodiments, the one or more video encoding modules 122 of the video encoder 102 may also use these additional features:

1. When there is up to one frame in each list, the value "1" is not used, so the value "1" may be moved to the back of lookup table. Accordingly, the lookup table may be changed to {0, 2, 4, 1, 3, 6, 5, 7}. Alternatively, when backward ("list 1") prediction is prohibited, the lookup table may be changed to {0, 4, 1, 2, 3, 6, 5, 7}.
2. When one CU is in direct mode (i.e., always using the reference frame with the index of 0), the direction of the direct mode may be encoded using two data bits. Accordingly, in such a scenario, the use of the lookup table to encode the direction of inter-prediction is not implemented. However, when there is one reference in each list, the lookup table may be used to adaptively code the order of the three modes (i.e., "list 0" direct mode, "list 1" direct mode, and bi-direct mode).
3. A maximum index value for the lookup table may be implemented to improve efficiency by reducing the number of values that are to be looked up during combined coding. In a current coding scheme, no maximum index value of all possibilities is used as the maximum index value is implicitly seven (e.g., counting from 0, there are eight entries in the lookup table, so the maximum reference frame number that is possible is "7"). For example:
    a) when the maximum reference frame number for each list is "1", and backward ("list 1") prediction is allowed, the maximum index value (counting from "0") may be established as "2", as the used values from the lookup table is {0, 2, 4};
    b) when the maximum reference frame number for each list is "1", and backward ("list 1") prediction is prohibited as described above, the maximum index value (counting from "0") may be established as "1", as the used values from the lookup table is {0, 1};
    c) when the maximum reference frame number for each list is "2", and backward ("list 1") prediction is allowed, the maximum index value (counting from "0") may be established as "7", as the used values from the lookup table is {0, 2, 1, 4, 3, 6, 5, 7}; and
    d) when the maximum reference frame number for each list is "2", and backward ("list 1") prediction is not allowed, the maximum index value (counting from "0") may be established at "5", as the used values from the lookup table is {0, 1, 4, 6, 5, 7, 2, 3}.

In further embodiments, when at least one list has more than two reference frames, the video encoder 102 may be configured to not use the lookup table. However, the use of the lookup table may be helpful to improve coding efficiency in other embodiments. Thus, in these other embodiments, the lookup table may be extended from having eight entries to nine entries in one example, in which the first eight entries have the same value and definitions as in Table I. The last ninth exception entry may include an exception value (e.g., exception value 112) that indicates that the number of index values in at least one reference frame index of a list is equal or larger than the highest number of frames in "list 1" and list "0" (e.g., "2"). The number of index values in a reference frame index may correspond to the number of reference frames in a corresponding list of reference frames. Thus, when a video decoder counterpart to the video encoder 102 receives the exception entry, the video decoder may decode the inter prediction direction and the reference frame index separately.

The video encoder 102 may use the adaptive selection module 124 to determine whether the syntax elements of a CU for the particular frame is to be combined coded using the lookup table or whether the syntax elements of the CU are to be encoded separately. The syntax elements may include the inter-prediction direction and at least one frame index.

In at least one embodiment, if the adaptive selection module 124 determines that none of the surrounding (left, above and above left) prediction units (PUs) of a particular CU (e.g., a frame) uses pixel data from a reference frame with a reference frame index value equal to or greater than a highest number of frames in "list 1" and list "0" (e.g., "2"), the video encoder 102 may use the lookup table with the nine entries to combined encode the inter-prediction direction and at least one corresponding frame index value for the particular CU. However, if the video encoder 102 attempts to use the lookup table and encounters an exception, meaning that least one list has more than two reference frames, the video encoder 102 may exclude the syntax element combinations defined in the lookup table, which may help the video encoder 102 to encode the syntax elements efficiently despite having to encode the syntax elements separately rather than in combination.

Otherwise, if the adaptive selection module 124 determines that at least one of the surrounding PUs of a particular CU uses pixel data from a reference frame with a reference frame index value equal to or greater than the highest number of frames in "list 1" and list "0" (e.g., "2"), the video encoder 102 may encode the syntax elements of the particular CU separately without the use of the lookup table.

In additional embodiments, the one or more of the encoding modules 122 of the video encoder 102 may also implement the use of the maximum index value in combination with the adaptive selection module 124. For example, when the maximum reference frame number is greater than "2", and "list 1" prediction is allowed, the maximum index value (counting from "0") may be established as "8". In another example, when the maximum reference frame number is greater than "2", and backward ("list 1") prediction is not allowed, the maximum index value (counting from "0") may be established as "6".

Adaptive Order for Coding Split and Skip Flags

A quad-tree structure may be used to provide CUs for coding input video signals. In various implementations, when a particular CU has a size that is larger than a predetermined size, the particular CU may be split into-sub CUs, and the video encoder 102 may use a split flag to represent the split status of the particular CU. For example, each CU may be split into sub-units when a size of the CU (e.g., 64 pixels by 64 pixels) exceeds a predetermined CU size limit (e.g., 8 pixels by 8 pixels). In one implementation, when the split flag of a particular CU is set to a value of "1", the value means that the particular CU is further split. In contrast, when the split flag of a particular CU is set to a value of "0", the value means that the particular CU is not be further split.

Furthermore, when a CU is designated as not further split, the CU may be further designated as being in a skip mode, which in turn may be represented by a skip flag. For example, when the value of a skip flag is set to "1" for a particular CU, the CU is in skip mode. However, when the value of the skip flag is set to "0" for a particular CU, the particular CU is not in skip mode. Accordingly, there may be three different possibilities for a status of each CU. For a particular CU, a first case may be that the particular CU is further split, a second case may be that the particular CU is not further split and is in skip mode, and a third case is that the CU is not to be further split and the CPU is also not in skip mode.

The flag order module 126 may determine the order that a split flag and a skip flag are to be encoded for each CU. When the split flag is encoded first, the three cases above may be respectively represented by bits "1", "01", and "00", in which the first bit is the split flag value, and the second bit (if any) is the skip flag value. In contrast, when the skip flag is encoded first, the three cases above may be respectively represented by bits "01", "1", and "00", in which the first bit is the skip flag value, and the second bit (if any) is the split flag value. Accordingly, the representation of each of the three cases in the two encoding schemes is shown below in Table II.

TABLE II

Split Flag and Skip Flag Coding Scenarios

| Case | No. 1 | No. 2 | No. 3 |
| --- | --- | --- | --- |
| Split Flag Encoded First | "1" | "01" | "00" |
| Skip Flag Encoded First | "01" | "1" | "00" |

Further, as can be observed from the above, encoding the split flag value first results in one less bit being used as compared to encoding the skip flag value first when the CU is in the first case (CU is further split), as the status of the CU in the first case may simply be represented by "1" instead of "01". However, when the CU is in the second case (CU is not split and in skip mode), the encoding of the skip flag value first rather than the split flag value first may result in less bit being used, as the status of the CU in the second case may simply be represented by "1" instead of "01". Additionally, there is no difference for the third case regardless of which type of flag is encoded first.

Accordingly, the video encoder 102 may use the flag order module 126 to determine whether to encode the split flag value first or the skip flag value first for each CU. In some embodiments, the flag order module 126 may count the number of the first case (CU is further split) and the second case (CU is not split and in skip mode) for a group of CUs, such as the CUs in a slice. A slice may include one or more non-overlapping CUs. If there are more first cases than second cases, then the flag order module 126 may indicate to the video encoder 102 to encode the split flag value first for each CU in the group of CUs. Otherwise, the flag order module 126 may indicate to the video encoder 102 to encode the skip flag value first for each CU in the group of CUs.

In other embodiments, the flag order module 126 may assess conditions that surround a particular CU to decided which flag value is to be coded first for the particular CU. For example, if there are more first cases than second cases in the surrounding (e.g., left, directly above, and above left) largest coding units (LCUs) of a particular CU, then the flag order module 126 may cause the video encoder 102 to encode the split flag value first for the particular CU. Each LCU may be a CU that meets a predetermined CU size threshold in a slice. Otherwise, the flag order module 126 may cause the video encoder 102 to encode the skip flag value first for the particular CU.

Combined and Adaptive Coding of CBF Values

In some video encoding schemes, Residue Quad-tree (RQT) may be adopted to represent residue information, which may in some instances be generated by the intra-frame or the inter-frame prediction implemented by the video encoder 102. When the residue information is represented using RQT, the video encoder 102 may encode the residue information, the quad-tree structure, and the CBF information related to the quad-tree structure, in order to facilitate the eventual decoding of the residue information by a video decoder. A CBF may indicate whether a particular transform unit (TU) has residue information or not. For example, when the value of a CBF is "0", the particular TU may not have any residue information. However, when the value of the CBF is "1", the particular TU may have residue information. A TU is a basic unit in a frame that undergoes transform and/or quantization, and the TU may be a part of a CU.

Moreover, in instances for which input video signals are encoded according to the YUV color space that contains a luma (Y) component, and two chrominance (U and V) components, residue information may be generated for each of the Y, U, and V components. Accordingly, in some instances, the CBF information for the Y, U, and V components may be combined coded to improve coding efficiency.

However, the combined coding of the CBF information does not always improve coding efficiency. For example, in some other implementations of RQT-based residue coding, when a maximum RQT depth>2, the video encoder 102 may disable the combined coding of CBF information. The disablement of the combined coding of CBF information by the video encoder 102 may be explained with respect to TUs that are illustrated in FIG. 2.

Figure 2:
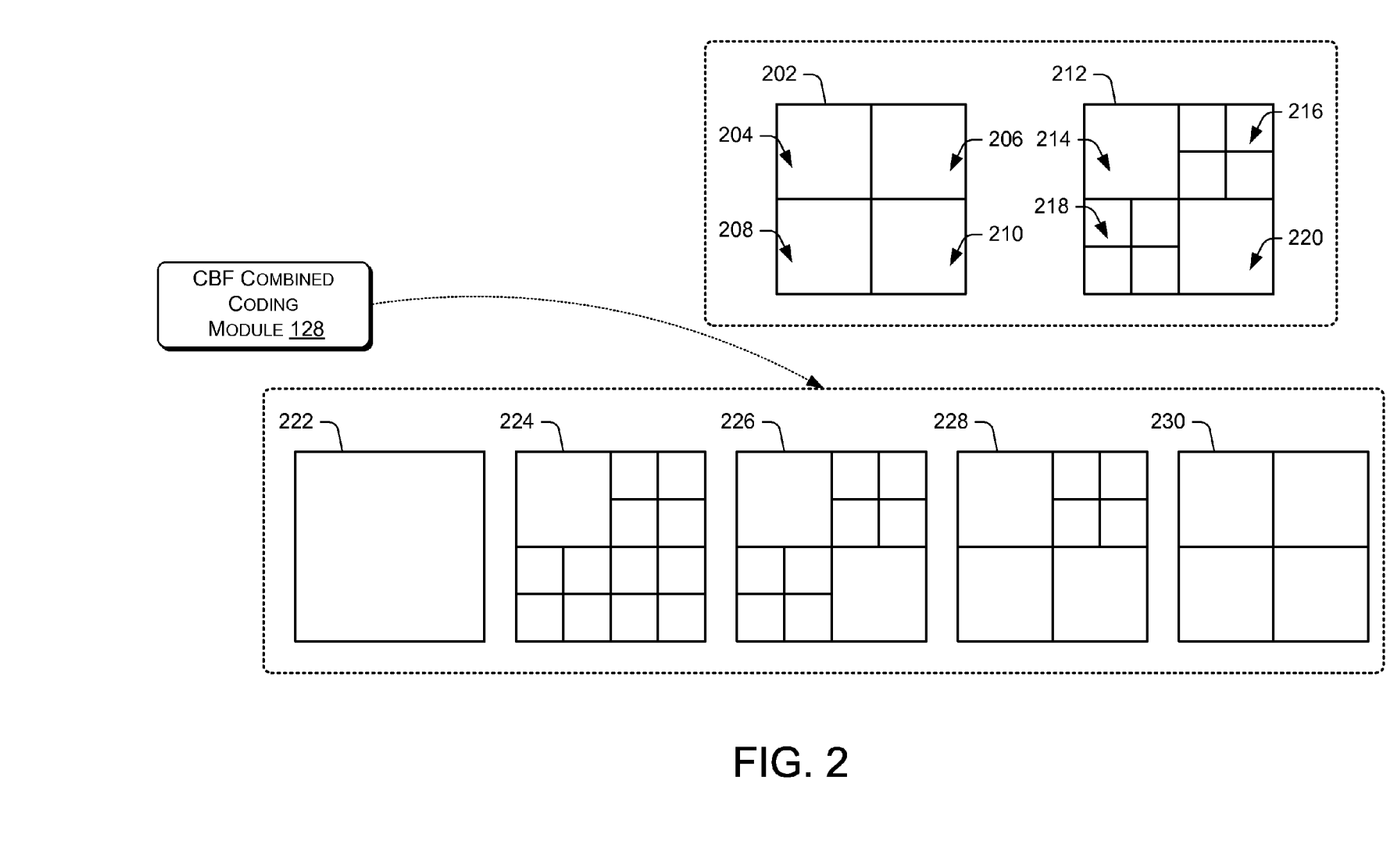
FIG. 2 is a block diagram that illustrates transform units (TUs) in the form of blocks with different Reside Quad-tree (RQT) depth.

FIG. 2 is a block diagram that illustrates transform units with different Reside Quad-tree (RQT) depth. As shown in FIG. 2, when maximum RQT depth=2, a TU 202 may be in one of two states, i.e., split or not split, and the sub-units 204, 206, 208, and 210 have the same transform depth. As such, the combined coding of the CBF information may improve coding efficiency. However, when the maximum RQT depth>2, the depth of the sub-units in a TU may vary. For example, in the case of the TU 212 shown in FIG. 2, the depth of the sub-units 214 and 220 may be "1", while the depth of the sub-units 216 and 218 may be "2". Since the sub-units 216 and 218 are further split into additional smaller sub-units, it is unnecessary to encode the CBF information of the sub-units 216 and 218. As a result, the combined coding of the CBF values of the sub-units 214, 216, 218, and 220 may be unproductive. As a result, in some other implementations of the RQT-based residue coding, the video encoder 102 may be configured to forego combined coding of CBF values when the maximum RQT depth is >2.

In various embodiments, the video encoder 102 may be configured to overcome the deficiencies of these other implementations by using the CBF coding module 128 to collectively code CBF information for all scenarios, such in instances when the maximum RQT depth>2, as well as when the maximum RQT depth=2. In such embodiments, the video encoder 102 may handle intra-coded TUs and inter-coded TUs differently. As used herein, an intra-coded TU refers to a TU that is generated using intra-prediction. Conversely, an inter-code TU refers to a TU that is generated using inter-prediction.

For intra-coded TUs, an encoding module 120 may initially code the quad-tree for a particular TU. Subsequently, the CBF coding module 128 may code the CBF values of the TU. When the TU is not split, the CBF values of the Y, U, and V components may be combined coded with an adaptive technique. In various embodiments, the adaptive technique is a technique in which a current code value that is used for combined coding may be swapped with a preceding decoded code value. For example, if an lookup table for combined coding is {0, 1, 2, 3} and the currently used code value that is used is "2", then the code value "2" may be swapped with the preceding code value "1", which results in the lookup table becoming {0, 2, 1, 3} for the next usage.

If the TU is split, at each layer of the split, only the CBF values of the Y, U, and V components of the sub-unit that is not further split may be combined coded. For example, when only one sub-unit is not split in the current layer, the CBF values of the Y, U, and V components of this sub-unit may be combined coded. When there are two sub-units that are not split in the current layer, the two CBF values of the corresponding Y components may be combined coded. Additionally, the two CBF values of the corresponding U components may be combined coded, and the two CBF values of the corresponding V components may be combined coded.

Likewise, when there are three sub-units that are not split in the current layer, the three CBF values of the corresponding Y components may be combined coded. Further, the three CBF values of the corresponding U components may be combined coded. Additionally, the three CBF values of the corresponding V components may be combined coded.

However, when all four sub-units are not split, the four CBF values of the corresponding Y components may be combined coded using the adaptive technique, and the UV CBF root may be combined coded using the adaptive technique. In various embodiments, the UV CBF root may be the combination of a U CBF root and a V CBF root, which may be represented by the expression UV cbf root=(U_cbf_root<<1)+V_cbf_root. In turn, the U CBF root is the CBF value that describes the CBF values of the corresponding U components belonging to the four sub-units. As such, if there is at least one U CBF of the four sub-units has a value that is not zero, the value of the U CBF root may be "1". In the same way, the V CBF root is the CBF value that describes the CBF values of the corresponding V components belonging to the four sub-units. As such, if there is at least one V CBF of the four sub-units has a value that is not zero, the value of the V CBF root may be "1".

Further, when the value of the U CBF root is not zero, the four U CBF values of the corresponding U components may be combined coded using the adaptive technique. Likewise, when the value of the V CBF root is not zero, the four V CBF values of the corresponding V components may be combined coded using the adaptive technique.

The combined coding of the CBF information for each intra-coded TU may be implemented using coding bits of schemes I, II, and/or III, in which the schemes I and III are illustrated below in Tables III and IV.

TABLE III

Coding Bits of Combined Coding Scheme I

| n | Coding Bits |
|---|---|
| 0 | 1 |
| 1 | 01 |
| 2 | 001 |
| 3 | 0001 |
| 4 | 00001 |
| 5 | 000001 |
| 6 | 0000001 |
| 7 | 0000000 |

As shown in Table III, in the scheme I, the value of n that is not zero or the maximum value may be encoded by the number of zeros that precede a value "1". For example, n=1 is represented by "01", while n=2 is represented by "001", and so on and so forth. Further, n=0 is represented by "1", and when n is the maximum value (e.g., the value "7"), n may be represented by a corresponding number of "0"s without a "1" suffix.

The scheme II may be implemented using writeCode (val, len), in which val is less than pow (2, len). The value of val may be written in binary format with the length of len. For the sake of simplicity, the values of val and their corresponding coding bits are not illustrated in a table.

The scheme III may be implemented such that if a value is 0, writeCode(0, 2) may be adopted. If the value is less than 10, writeCode(value+3, 4) may be adopted. Otherwise, writeCode(value+16, 5) may be adopted. It will be appreciated that writeCode(value+3, 4) and writeCode(value+16, 5) are implemented so that the resulting binary coding bits do not including any overlapping numerical sequences. As such, the binary coding bits in accordance with the scheme III are illustrated in table IV below.

TABLE IV

Coding Bits of Combined Coding Scheme III

| Value | Coding Bits |
|---|---|
| 0 | 00 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |
| 10 | 11010 |
| 11 | 11011 |
| 12 | 11100 |
| 13 | 11101 |
| 14 | 11110 |
| 15 | 11111 |

Accordingly, for a TU that is not split, as illustrated by the TU 222, the CBF values of the Y, U, and V components may be combined coded with an adaptive technique. For each of the Y, U, and V components in the TU, the CBF value may be either 0 or 1, so there may be eight combinations of CBF values, and the value(CBF) may range be from "0" to "7". For example, the combination of CBF values "000", which may correspond to Y=0, U=0, and V=0, may be assigned a value of "0", the combination of CBF values "001" which may correspond to Y=0, U=0, and V=1, may be assigned a value of "1", the combination of CBF values "010" which may correspond to Y=0, U=1, and V=0, may be assigned a value of "2", and so on and so forth.

Accordingly, an initial lookup table {4, 0, 6, 7, 5, 1, 2, 3} may be used for encoding the CBF values of the Y, U, and V components of the TU, in which the values of the initial lookup table corresponding to the values outlined in the scheme I. Further, the CBF coding module 128 may encode the CBF values of the Y, U, and V components of the TU according to the scheme I.

Further, if a current layer of a TU contains only one sub-unit that is not split as described above, such as illustrated by a TU 224, the CBF values of the Y, U, and V components of this sub-unit may be combined coded with an adaptive technique. Accordingly, for each of the Y, U, and V components in the sub-unit, the CBF value may be either 0 or 1, so there may be eight combinations of CBF values, and the value of each combination may range be from "0" to "7". Accordingly, an initial lookup table {4, 0, 6, 7, 5, 1, 2, 3} may be used for encoding the CBF values of the Y, U, and V components of the sub-unit, in which the values of the initial lookup table corresponding to the values outlined in the scheme I. Further, the CBF coding module 128 may encode the CBF values of the Y, U, and V components of the sub-unit according to the scheme I.

However, if a current layer of a TU contains two sub-units that are not split as described above, such as illustrated by a TU 226, the two CBF values of the corresponding Y components may be combined coded. Additionally, the two CBF values of the corresponding U components may be combined coded, and the two CBF values of the corresponding V components may be combined coded.

Accordingly, there may be four combinations of two CBF value pairs for each of the corresponding Y, U, and V components. Thus, for the corresponding Y components, if the CBF value pair is "00", then the value "1" may be encoded, if the CBF value pair is "01", then the value "2" may be encoded, if the CBF value pair is "10", then the value "3" may be encoded, and if the CBF value pair is "11", then the value "0" may be encoded.

Likewise, for the corresponding U components, if the CBF value pair is "00", then the value "0" may be encoded, if the CBF value pair is "01", then the value "1" may be encoded, if the CBF value pair is "10", then the value "2" may be encoded, and if the CBF value pair is "11", then the value "3" may be encoded. Additionally, for the corresponding V components, if the CBF value pair is "00", then the value "0" may be encoded, if the CBF value pair is "01", then the value "1" may be encoded, if the CBF value pair is "10", then the value "2" may be encoded, and if the CBF value pair is "11", then the value "3" may be encoded. In other words, the encoding of the CBF value pairs for the corresponding V components may be implemented in the same manner as the encoding of the of the CBF value pairs for the corresponding U components. Further, the CBF coding module 128 may encode the CBF values of the two sub-units according to the scheme I.

However, if a current layer of a TU contains three sub-units that are not split as described above, such as illustrated by a TU 228, the three CBF values of the corresponding Y components may be combined coded. Likewise, the three CBF values of the corresponding U components may be combined coded. Additionally, the three CBF values of the corresponding V components may be combined coded. Accordingly, there may be eight combinations of three CBF values for each of the Y, U, and V components. For example, the combination of CBF values "000", which may correspond to $Y_1=0$, $Y_2=0$, and $Y_3=0$, may be assigned a combined coded value of "0", the combination of CBF values "001" which may correspond to $Y_1=0$, $Y_2=0$, and $Y_3=1$, may be assigned a combined coded value of "1", the combination of CBF values "010" which may correspond to $Y_1=0$, $Y_2=1$, and $Y_3=0$, may be assigned a combined coded value of "2", and so on and so forth. Similar assignment of combine coded values may be implemented for the combination of CBF values for the corresponding U components and the corresponding V components.

Thus, for the corresponding Y components, if a particular CBF combined coded value is "7", writeCode(0, 1) may be adopted, if a particular CBF combined coded value is "0", writeCode(4, 3) may be adopted. Otherwise, writeCode(cbf+9, 4) may be adopted, in which cbf is the assigned CBF combined coded value.

Likewise, for the corresponding U components, if a particular CBF combined coded value is "0", writeCode(0, 1) may be adopted, if a particular CBF combined coded value is "1", writeCode(4, 3) may be adopted. Otherwise, writeCode(cbf+8, 4) may be adopted, in which cbf is the CBF combined coded value.

Additionally, for the corresponding V components, if a particular CBF combined coded value is "0", writeCode(0, 1) may be adopted, if a particular CBF combined coded value is "1", writeCode(4, 3) may be adopted. Otherwise, writeCode(cbf+8, 4) may be adopted, in which cbf is the CBF assigned combined coded value. In other words, the CBF coding module 128 may encode the CBF combined coded values for each of the corresponding Y, U, and V components of the three sub-units according to the scheme II.

Furthermore, if a current layer of a TU contains four sub-units that are not split as described above, such as illustrated by a TU 230, the four CBF values of the corresponding Y components may be combined coded using the adaptive technique, and the values of the UV CBF root may be combined coded using the adaptive technique. Accordingly, there may be 16 combinations of four CBF values for each of the Y, U, and V components. For example, the combination of CBF values "0000", which may correspond to $Y_1=0$, $Y_2=0$, $Y_3=0$, and $Y_4=0$, may be assigned a combined coded value of "0", the combination of CBF values "0001" which may correspond to $Y_1=0$, $Y_2=0$, $Y_3=0$, and $Y_4=1$ may be assigned a combined coded value of "1", and so on and so forth.

Accordingly, for the corresponding Y components, an initial lookup table {15, 0, 3, 5, 7, 10, 11, 12, 13, 14, 1, 2, 4, 8, 6, 9} may be used for encoding, in which the values of the initial lookup table corresponding to the values outlined in the scheme III, and the CBF coding module 128 may encode the corresponding Y components according to the scheme III. However, with respect to the UV CBF root, the two UV CBF values may be combined coded. An initial lookup table {0, 1, 2, 3} may be used for the combined coding, and the CBF coding module 128 may encode the values of the UV CBF root according to scheme I. However, if the CBF values of the corresponding U components are to be further encoded, the four CBF values of the corresponding U components may be combined coded using the adaptive technique. An initial lookup table {0, 1, 2, 3, 4, 5, 8, 10, 12, 15, 6, 7, 9, 11, 13, 14} may be used for the combined coding using the adaptive technique, and the CBF coding module 128 may encode the four CBF values of the corresponding U components according to scheme III.

The combined coding of the CBF information for each inter-coded TU may be implemented using coding bits of a scheme IV. The scheme IV may be implemented such that if a value is 0, writeCode(0, 3) may be adopted. If the value is less than 14, writeCode(value+1, 4) may be adopted. If the value is 14, writeCode(30, 5) may be adopted, and if the value is 15, writeCode(31, 5) may be adopted. It will be appreciated that writeCode(value+1, 4), writeCode(30, 5), and writeCode (31, 5) are respectively implemented so that the resulting binary coding bits do not including any overlapping numerical sequences. As such, the binary coding bits in accordance with the scheme III are illustrated in table IV below.

TABLE V

Coding Bits of Combined Coding Scheme IV

| Value | Coding Bits |
|---|---|
| 0 | 000 |
| 1 | 0010 |
| 2 | 0011 |
| 3 | 0100 |
| 4 | 0101 |
| 5 | 0110 |
| 6 | 0111 |
| 7 | 1000 |
| 8 | 1001 |
| 9 | 1010 |
| 10 | 1011 |
| 11 | 1100 |
| 12 | 1101 |
| 13 | 1110 |
| 14 | 11110 |
| 15 | 11111 |

In some embodiments, a value for the YUV CBF root of an inter-coded TU may be combined coded using an adaptive technique. In various embodiments, the YUV CBF root may be the combination of a Y CBF root, a U CBF root, and a V CBF root. In some embodiments, an initial lookup table {0, 4, 5, 6, 7, 1, 2, 3} may be used for the encoding of the YUV CBF root according to scheme I. If at least one CBF is not 0, a quad-tree may be coded for the inter-coded TU by an encoding module 120. At each layer, the CBF value of the U component may be encoded separately without combined coding when the CBF of a corresponding U component in an upper layer to the layer has a value of "1". Likewise, at each layer, the CBF value of the V component may be encoded separately without combined coding when the CBF of a corresponding V component in an upper layer to the layer has a value of "1".

If a current layer includes one, two or three sub-units that are not split, as illustrated by the TUs 224, 226, and 228, respectively, the CBF of the corresponding Y components may be encoded without using combined coding. Further, if a current layer includes four TUs are not split, as illustrated by TU 230, the four CBF values of the corresponding Y components may be combined coded using the adaptive technique. An initial lookup table {1, 2, 4, 8, 15, 3, 5, 6, 7, 10, 11, 12, 13, 14, 9, 0} may be used for the combined coding, and CBF coding module 128 may encode the four CBF values of the corresponding Y components according to scheme IV.

Thus, as described above, the adaptive combined coding of CBF values may improve CBF coding efficiency. Moreover, since a TU may be part of a CU, the techniques for adaptively combined coding the CBF values described above may be equally applicable to CUs in other embodiments.

Returning to FIG. 1, the user interface module 130 may enable a user to interact with the various modules on the electronic device 104 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. In at least one embodiment, the user interface module 130 may enable the user to monitor the progress of the video encoder 102 or adjust the various values that are used by the video encoder 102.

The data store 132 may store the digital video data 110 that is generated by the video encoder 102. The stored digital video data 110 may be further transmitted to a video decoder for decoding and presentation on a display device. Additionally, the data store 132 may also store other intermediate products or values that are generated or used by video encoder 102.

EXAMPLE PROCESSES

FIGS. 3-7 describe various example processes for implementing improvements in video encoding. The order in which the operations are described in each example process is not intended to be construed as a limitation, and any number of the described operations can be combined in any order and/or in parallel to implement each process. Moreover, the operations in each of the FIGS. 3-7 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 3:
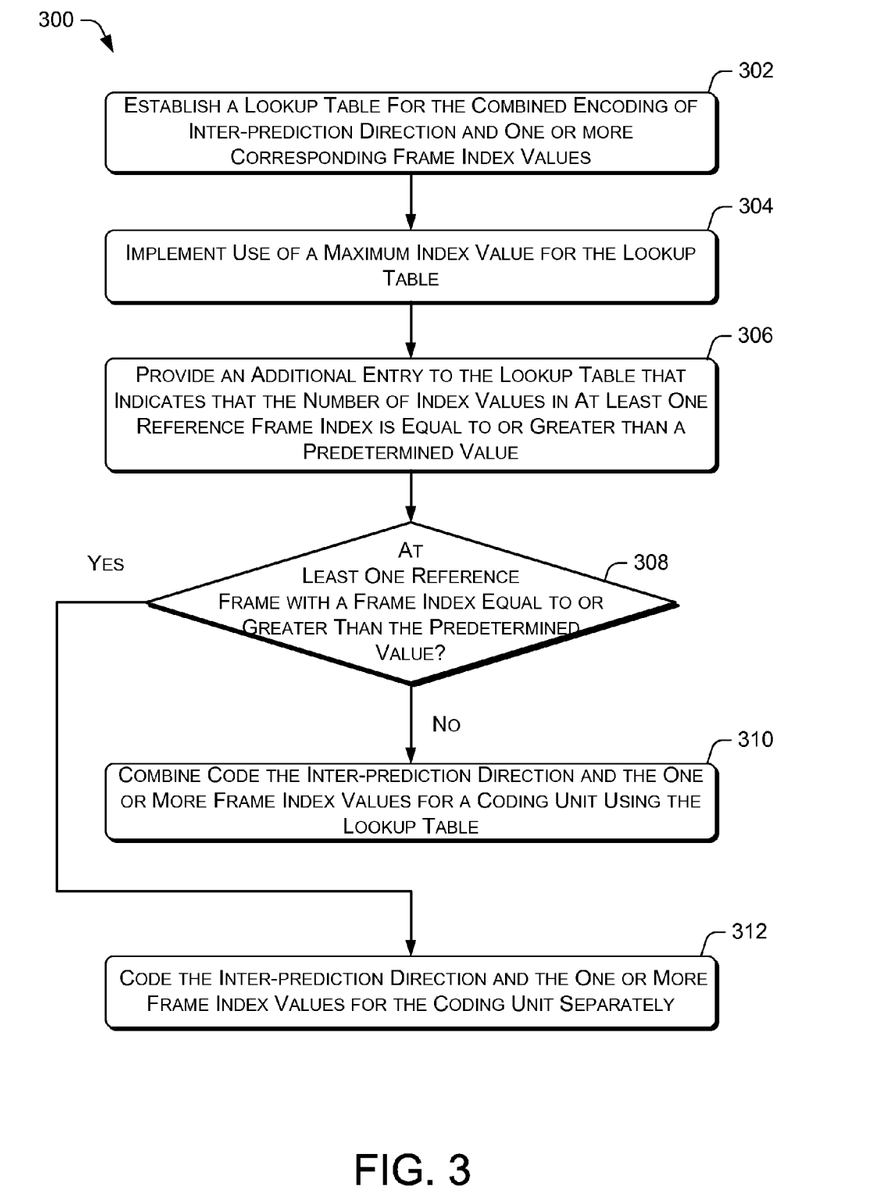
FIG. 3 is a flow diagram that illustrates an example process to use a modified lookup table to combined code the inter-prediction direction and a frame index for a coding unit (CU).

FIG. 3 is a flow diagram that illustrates an example process 300 to use a modified lookup table to combined code the inter-prediction direction and a frame index for a coding unit (CU).

At block 302, a lookup table may be established for the combined coding of inter-prediction direction and a corresponding frame index value by the video encoder 102. The inter-prediction may enable the pixel data of a CU in a particular frame to be predicted from pixel data in one or more other frames, such as one or more prior frames or one or more subsequent frames. In various embodiments, the lookup table may be established based on the values and definitions illustrated in example Table I, in which the order of the values in the lookup table may be ordered according a probability of each value occurring during an applicable encoding scenario. For example, the lookup table may be established based on whether backward ("list 1") prediction is allowed or prohibited.

At block 304, a maximum index value may be implemented for use with the lookup table. The particular maximum index value implemented may be based on the number of frames in each group of frames (e.g., "list 0") that is used for the inter-prediction, as indicated by a corresponding reference frame index, and/or whether backward ("list 1") prediction is allowed. In various embodiments, each of the reference frame indices may count the number of frames in the group of frames from "0". The implementation of the maximum index value may increase encoding efficiency by excluding the lookup of non-applicable values.

At block 306, an additional entry to the lookup table may be provided that indicates that the number index values in at least one reference frame index of one or more groups of frames is equal to or greater than a predetermined value. In some embodiments, the predetermined value may be "2". In other words, the additional entry may indicate that at least one of the groups of frames has a number of frames that meets or exceeds the predetermined value.

At decision block 308, the video encoder 102 may use an adaptive selection module 124 to determine whether the syntax elements of a coding unit (CU) of the particular frame is to be combined coded using the lookup table or whether the syntax elements of the CU are to be encoded separately. The syntax elements may include the inter-prediction direction and the one or more frame index values. If the adaptive selection module 124 determines that none of the surrounding (e.g. left, directly above, and above left) prediction units (PUs) of a particular CU uses pixel data from a reference frame with a reference frame index value equal to or greater than the predetermined value ("no" at decision block 308), the process 300 may proceed to block 310. At block 310, the video encoder 102 may use the lookup table to combined code the inter-prediction direction and one or more corresponding index values for the particular CU.

However, returning to decision block 308, if the adaptive selection module 124 determines that at least one of the surrounding PUs of a particular CU uses pixel data from a reference frame with a reference frame index value equal to or greater than the predetermined value (e.g., "2") ("yes" at decision block 308), the process 300 may proceed to block 312. At block 312, the video encoder 102 may encode the syntax elements of the particular CU separately without the use of the lookup table.

Figure 4:
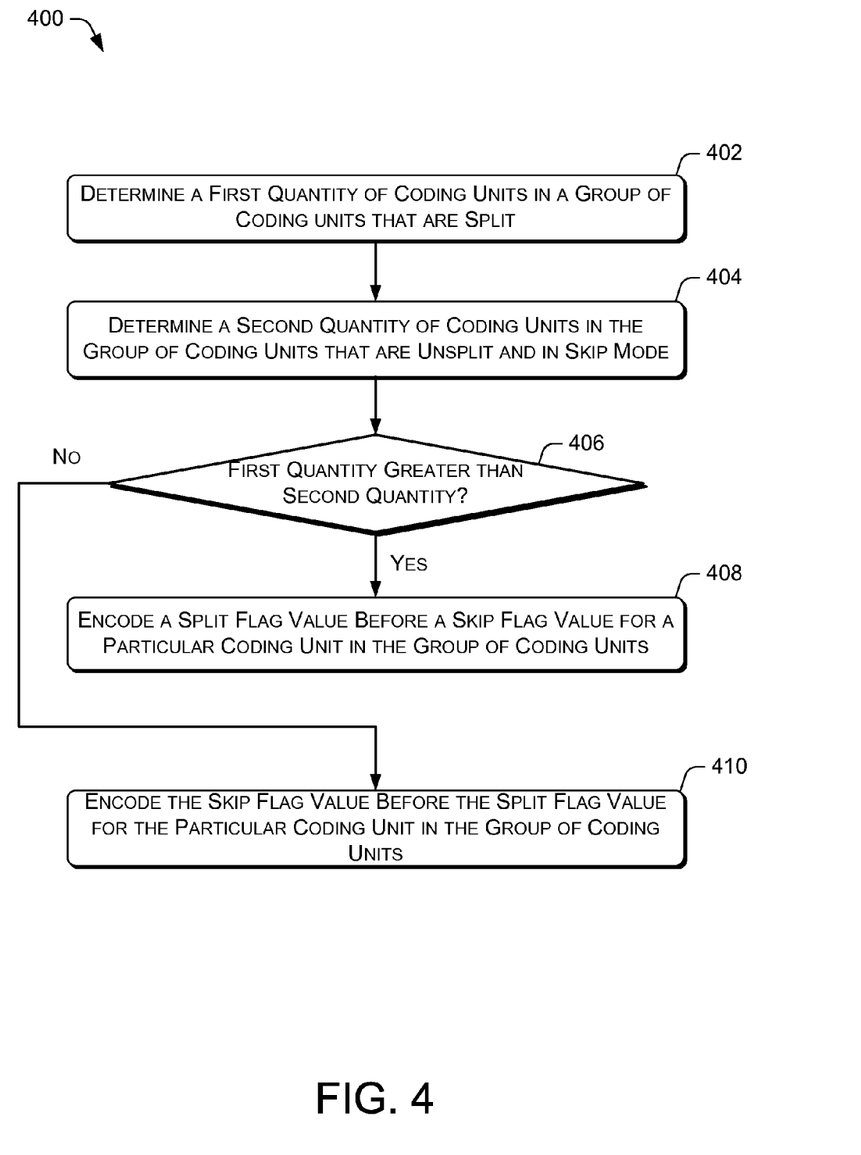
FIG. 4 is a flow diagram that illustrates an example process to select an order for coding a split flag and a skip flag for a particular code unit (CU) based on the numbers of split and unsplit CUs in a group of CUs.

FIG. 4 is a flow diagram that illustrates an example process 400 to select an order for coding a split flag and a skip flag for a particular code unit based on the numbers of split and unsplit coding units (CUs) in a group of CUs.

At block 402, the flag order module 126 may determine a first quantity of CUs of a group of CUs that are split into sub-units. In various implementations, when a particular CU has a size that is larger than a predetermined size, the CU may be split into sub-units, and the video encoder 102 may use a split flag to represent the split status of the CU.

At block 404, the flag order module 126 may determine a second quantity of CUs of the group of CUs that are unsplit and in skip mode. A particular CU may be in skip mode when the pixel data in the particular CU is being predicted from the pixel data in other CUs.

At decision block 406, the flag order module 126 may determine whether the first quantity is greater than the second quantity. If the first quantity is greater than the second quantity ("yes" at decision block 406), the process 400 may proceed to block 408. At block 408, the flag order module 126 may cause the video encoder 102 to encode a split flag value before a skip flag value for a particular CU that is in the group of CUs.

However, if the flag order module 126 determines that first quantity is not greater than the second quantity, i.e., the first quantity is less than or equal to the second quantity ("no" at decision block 406), the process 400 may proceed to block 410. At block 410, the flag order module 126 may cause the video encoder 102 to encode the skip flag value before the split flag value for the particular CU that is in the group of CUs.

Figure 5:
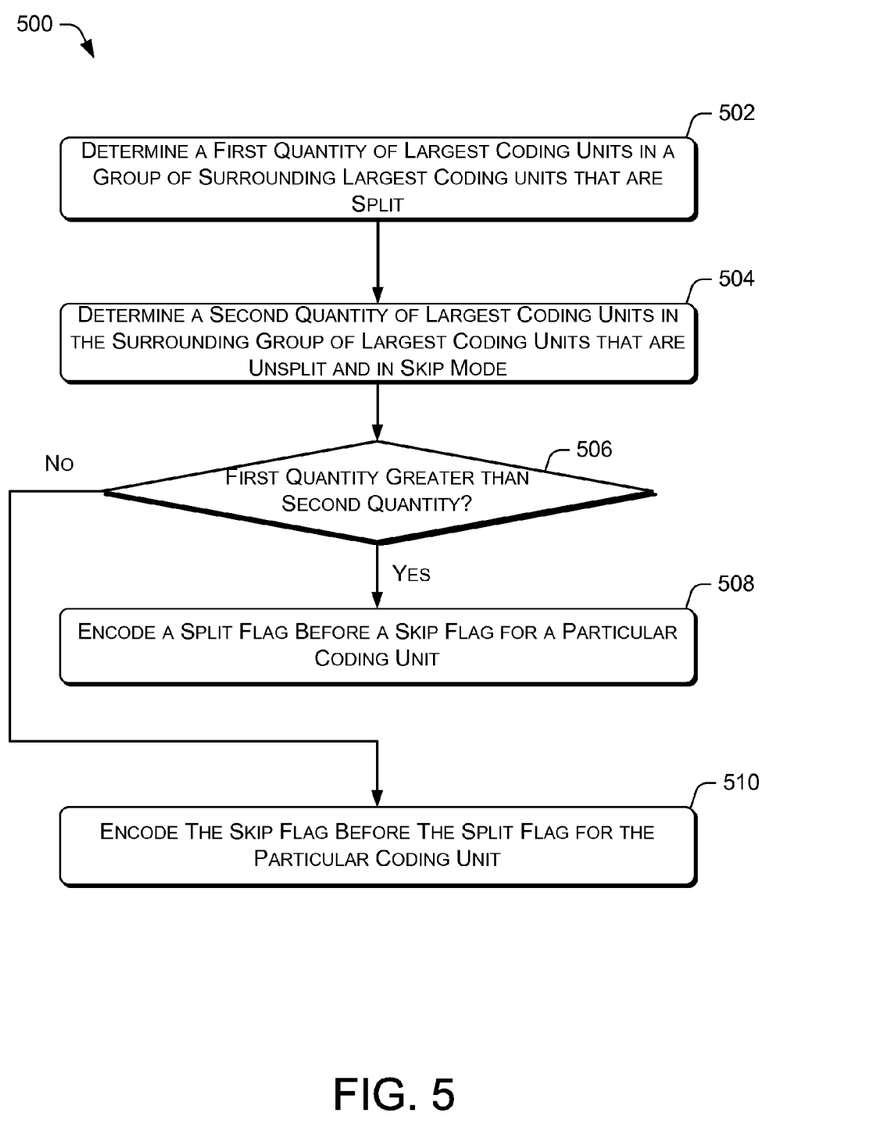
FIG. 5 is a flow diagram that illustrates an example process to select an order for coding a split flag and a skip flag for a particular code unit (CU) based on the numbers of split and unsplit coding units in the surrounding CUs of the particular CU.

FIG. 5 is a flow diagram that illustrates an example process 500 to select an order for coding a split flag and a skip flag for a particular CU based on the numbers of split and unsplit coding units in the surrounding CUs of the particular CU.

At block 502, the flag order module 126 may determine a first quantity of largest coding units (LCUs) surrounding (e.g., left, directly above, and above left) a particular CU in a frame that are split into sub-units. Each LCU may be a CU that meets a predetermined CU size threshold in a slice.

At block 504, the flag order module 126 may determine a second quantity of LCUs surrounding the particular CU in the frame that are unsplit and in skip mode. A particular CU may be in skip mode when the pixel data in the particular CU is being predicted from the pixel data in other CUs.

At decision block 506, the flag order module 126 may determine whether the first quantity is greater than the second quantity. If the first quantity is greater than the second quantity ("yes" at decision block 606), the process 500 may proceed to block 508. At block 508, the flag order module 126 may cause the video encoder 102 to encode a split flag value before a skip flag value for the particular CU.

However, if the flag order module 126 determines that first quantity is not greater than the second quantity, i.e., first quantity is less than or equal to the second quantity ("no" at decision block 506), the process 500 may proceed to block 510. At block 510, the flag order module 126 may cause the video encoder 102 to encode the skip flag value before the split flag value for the particular CU.

Figure 6:
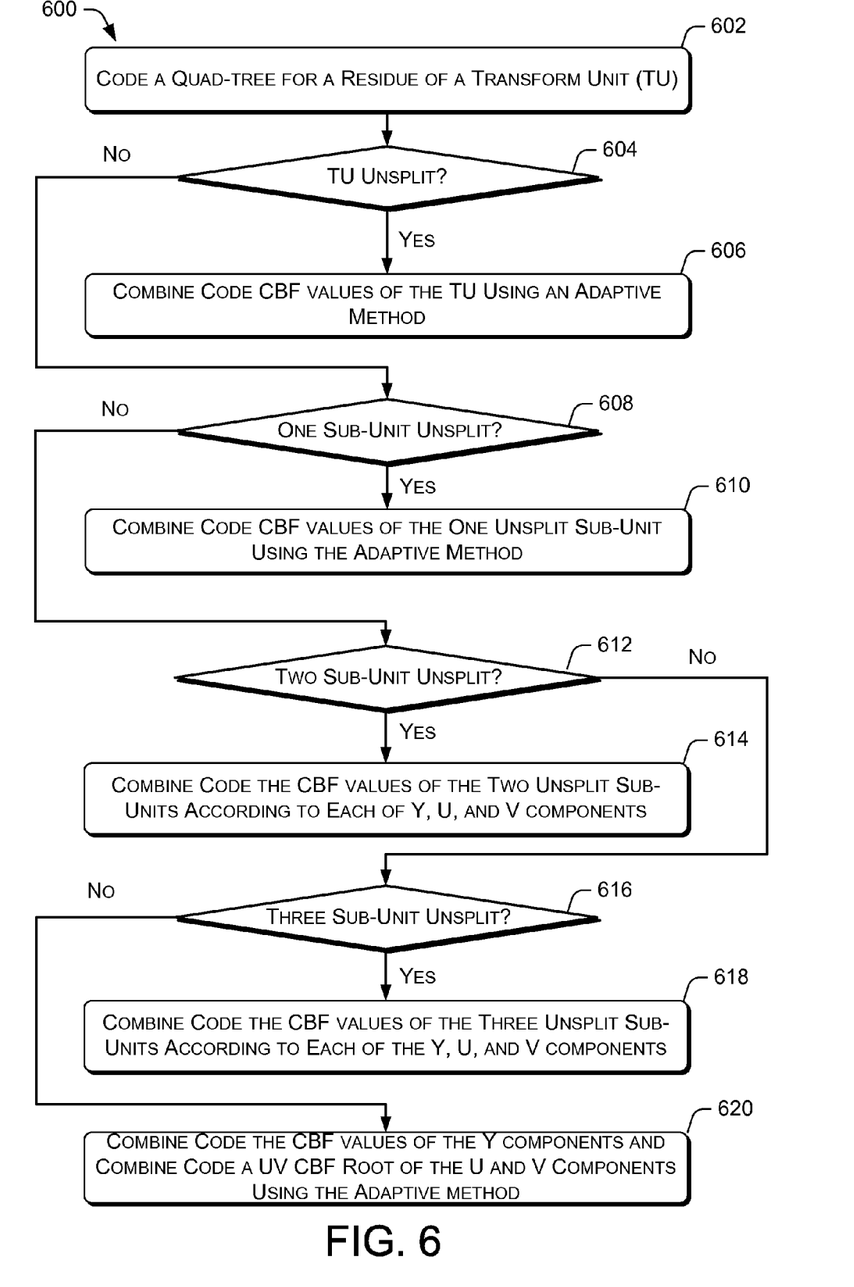
FIG. 6 is a flow diagram that illustrates an example process to combined code CBF values for an intra-coded TU.

FIG. 6 is a flow diagram that illustrates an example process 600 to combined code CBF values for an intra-coded TU. However, the example process 600 may be also applicable to an inter-coded CU in the same manner. At block 602, the video encoder 102 may code a quad-tree for a residue of a TU in a current layer. A quad-tree may be a tree data structure in which each internal node has four recursively divided children regions, in which each of the regions may be square or rectangular.

At decision block 604, the CBF coding module 128 may determine whether the TU is unsplit, in other words, not split into sub-units. If the CBF coding module 128 determines that the TU is unsplit ("yes" at decision block 604), the process 600 may continue to block 606. At block 606, the CBF coding module 128 may combined code the CBF values of the TU using an adaptive technique. The CBF values may be the CBF values for each of the Y, U, and V components of the TU. However, if the CBF coding module 128 determines that the TU is further split into sub-units ("no" at decision block 604), the process may continue to decision block 608.

At decision block 608, the CBF coding module 128 may determine whether the TU contains one sub-unit that is unsplit in a current layer, while the remaining sub-units of the TU are further split into additional sub-units. If the CBF coding module 128 determines that the TU contains one sub-unit that is unsplit ("yes" at decision block 608), the process 600 may further proceed to block 610.

At block 610, the CBF coding module 128 may combined code the CBF values of the unsplit sub-unit of the TU using the adaptive technique. The CBF values may be the CBF values for each of the Y, U, and V components of the unsplit sub-unit. However, if the CBF coding module 128 determines that more than one sub-unit of the TU is unsplit ("no" at decision block 608), the process may continue to decision block 612.

At decision block 612, the CBF coding module 128 may determine whether the TU contains two sub-units that are unsplit in a current layer, while the remaining sub-units of the TU are further split into additional sub-units. If the CBF coding module 128 determines that the TU contains two sub-units that are unsplit ("yes" at decision block 612), the process 600 may further proceed to block 614.

At block 614, the CBF coding module 128 may combined code the CBF values of the two unsplit sub-units according to each of the Y, U, and V components. Accordingly, the two CBF values of the corresponding Y components may be combined code. Further, the two CBF values of the corresponding U components may be combined coded, and the two CBF values of the corresponding V components may be combined coded. However, if the CBF coding module 128 determines that more than two sub-units of the TU are unsplit ("no" at decision block 612), the process may continue to decision block 616.

At decision block 616, the CBF coding module 128 may determine whether the TU contains three sub-units that are unsplit in a current layer, while the remaining sub-unit of the TU is further split into additional sub-units. If the CBF coding module 128 determines that the TU contains three sub-units that are unsplit ("yes" at decision block 616), the process 600 may further proceed to block 618.

At block 618, the CBF coding module 128 may combined code the CBF values of the three unsplit sub-units according to each of the Y, U, and V components. Accordingly, the three CBF values of the corresponding Y components may be combined coded. Further, the three CBF values of the corresponding U components may be combined coded, and the three CBF values of the corresponding V components may be combined coded.

However, if the CBF coding module 128 determines that all four sub-units of the TU are unsplit ("no" at decision block 616), the process may continue to block 620. At block 620, the CBF coding module 128 may combined code the CBF values of the Y components and further combined code the values of the UV CBF root using the adaptive technique. Further, when the value of the U CBF root is not zero, the four U CBF values of the corresponding U components may be combined coded using the adaptive technique. Likewise, when the value of the V CBF root is not zero, the four V CBF values of the corresponding V components may be combined coded using the adaptive technique.

Figure 7:
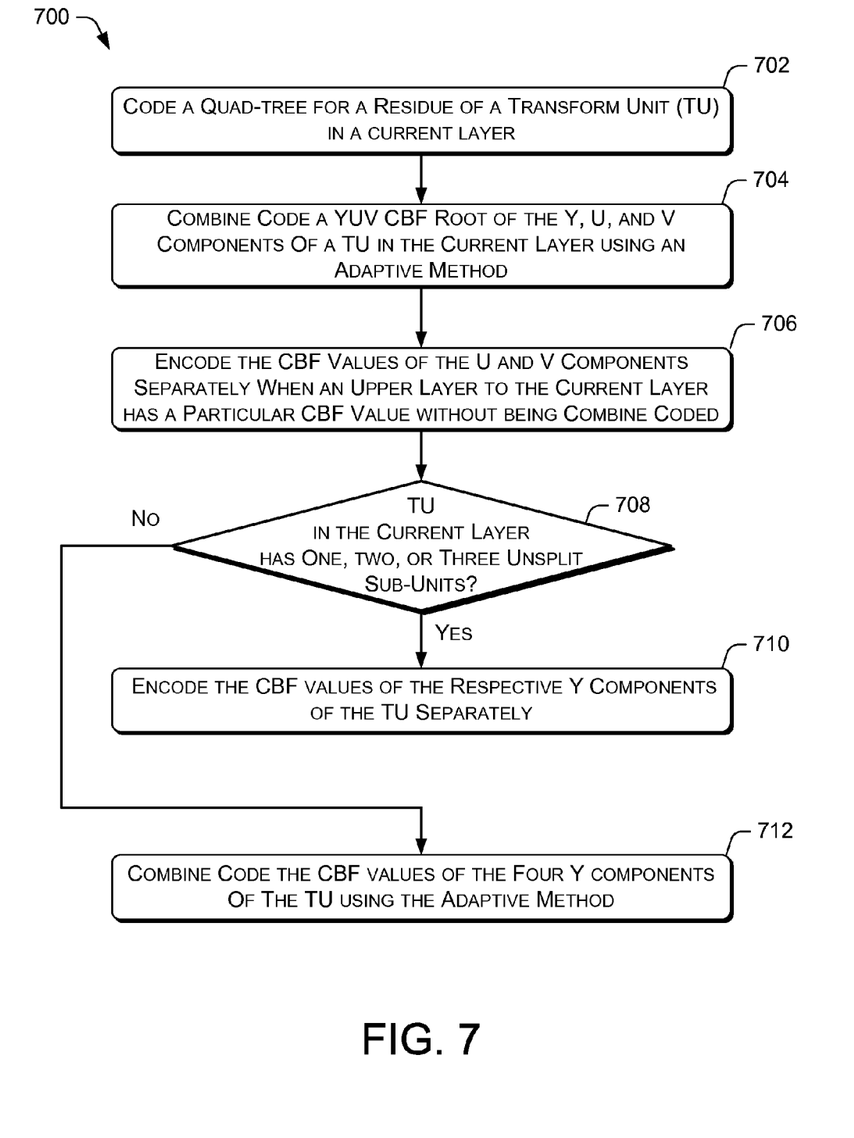
FIG. 7 is a flow diagram that illustrates an example process to combined code CBF values for an inter-coded TU.

FIG. 7 is a flow diagram that illustrates an example process 700 to combined code CBF values for an inter-coded TU. However, the example process 700 may be also applicable to an inter-coded CU in the same manner. At block 702, the video encoder 102 may code a quad-tree for a residue of a TU in a current layer. A quad-tree may be a tree data structure in which each internal node has four recursively divided children regions, in which each of the regions may be square or rectangular.

At block 704, the CBF coding module 128 may combined code the values of a YUV CBF root of a TU in a current layer using an adaptive technique. At block 706, the CBF coding module 128 may encode the CBF value of the U component separately without combined coding when the CBF of a corresponding U component in an upper layer to the layer has a particular value (e.g., a value of "1"). Likewise, the CBF value of the V component may be encoded separately without combined coding when the CBF of a corresponding V component in an upper layer to the layer has the particular value (e.g., a value of "1").

At decision block 708, the CBF coding module 128 may determine whether the TU in the current layer has one, two, or three unsplit sub-units. If the TU in the current layer does has one, two, or three unsplit sub-units ("yes" at decision block 708), the process 700 may proceed to block 710. At block 710, the CBF coding module 128 may encode the CBF values of the respective Y components of the TU separately.

However, if the TU in the current layer has four unsplit sub-units ("no" at decision block 708), the process 700 may proceed to block 712. At block 712, the CBF coding module 128 may combined code the CBF values of the four Y components of the TU using an adaptive technique.

The techniques described herein may enable a video encoder that conforms to the high efficiency video coding (HEVC) standard, such as video encoders that perform content-adaptive variable length coding (CAVLC), to achieve greater efficiency in encoding video data from input video signals. However, the improvements implemented by the techniques described herein in video encoding may also be applicable to video encoders that conform to other video encoding standards.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable storage device storing computer-executable instructions that, when executed, cause one or more processors to perform acts comprising:
 establishing a lookup table that includes entries used for combined coding of an inter-prediction direction and one or more corresponding frame index values for an inter-prediction of pixel data of a coding unit in a frame;
 providing an additional entry to the lookup table that indicates that a corresponding number of index values in at least one group of frames exceeds a predetermined value; and
 implementing a maximum index value for the lookup table based at least on a number of frames in each group of frames used in the inter-prediction of pixel data for the coding unit.

2. The computer-readable storage device of claim 1 wherein the implementing includes implementing the maximum index value for the lookup table based on the number of frames in each group of frames used in the inter-prediction of pixel data for the coding unit and whether pixel data in a prior frame to the frame is used during the inter-prediction of the pixel data of the coding unit in the frame.

3. The computer-readable storage device of claim 1, further comprising computer-executable instructions that, when executed, cause one or more processors to perform acts comprising:
 combined coding the inter-prediction direction and the one or more corresponding frame index values using the lookup table when prediction units surrounding the coding unit do not use pixel data from a reference frame with a reference index value equal to or greater than the predetermined value; and
 coding the inter-prediction direction and the one or more corresponding frame index values separately when at least one of the prediction units surrounding the coding unit uses the pixel data from the reference frame with the reference index value equal to or greater than the predetermined value.

4. The computer-readable storage device of claim 1, wherein each entry in the lookup table includes a value that correlates with a unique combination of the inter-prediction direction and one or more corresponding frame index values.

5. The computer-readable storage device of claim 1, wherein the establishing the lookup table includes ordering the entries in the lookup table based at least on one of a probability of a corresponding value in each entry occurring during the combined coding or whether pixel data in a prior frame to the frame is used during the inter-prediction of the pixel data of the coding unit in the frame.

6. The computer-readable storage device of claim 1, further comprising computer-executable instructions that, when executed, cause one or more processors to perform acts comprising:

determining a first quantity of coding units in a group of coding units that are split into sub-units and a second quantity of coding units in the group of coding units that are unsplit and in skip mode;

encoding a split flag before a skip flag for a particular coding unit in the group of coding units when the first quantity is greater than the second quantity; and encoding the skip flag before the split flag for the particular coding unit in the group of coding units when the first quantity is less than or equal to the second quantity.

7. The computer-readable storage device of claim 1, further comprising computer-executable instructions that, when executed, cause one or more processors to perform acts comprising:

determining a first quantity of coding units in a frame surrounding a particular coding unit that are split into sub-units and a second quantity of coding units in the frame surrounding the particular coding unit that are unsplit and in skip mode;

encoding a split flag before a skip flag for the particular coding unit in the group of coding units when the first quantity is greater than the second quantity; and encoding the skip flag before the split flag for the particular coding unit in the group of coding units when the first quantity is less than or equal to the second quantity.

8. The computer-readable storage device of claim 1, further comprising computer-executable instructions that, when executed, cause one or more processors to perform acts comprising:

coding a quad-tree for a residue of an inter-coded transform unit;

combined coding coded block flag (CBF) values associated with color space components of an intra-coded transform unit when the inter-coded transform unit is not split into sub-units; and combined coding the CBF values associated with the color space components that belong to each unsplit sub-unit of the intra-coded transform unit when the inter-coded transform unit is split into sub-units.

9. A computer-implemented method, comprising:

determining, at a computing device, a first quantity of at least one coding unit associated with a particular coding unit that are split into sub-units and a second quantity of at least one coding unit associated with the particular coding unit that are unsplit and in skip mode, the particular coding unit is a part of a group of coding units of a frame;

encoding, at the computing device, a split flag before a skip flag for the particular coding unit in the group of coding units when the first quantity is greater than the second quantity; and encoding, at the computing device, the skip flag before the split flag for the particular coding unit in the group of coding units when the first quantity is less than or equal to the second quantity.

10. The computer-implemented method of claim 9, wherein one or more coding units associated with the particular coding unit includes one or more coding units in a group of coding units of a slice to which the particular coding unit belongs or one or more coding units in the frame that surrounds the particular coding unit.

11. The computer-implemented method of claim 10, wherein encoding the split flag before the skip flag when the particular coding unit is split into additional sub-units uses less data than encoding the skip flag before the split flag, and wherein encoding the skip flag before the skip flag when the particular coding unit is unsplit and in skip mode uses less data than encoding the split flag before the skip flag.

12. The computer-implemented method of claim 10, wherein the one or more coding units in the frame includes a surrounding coding unit that meets a predetermined size threshold for the slice.

13. The computer-implemented method of claim 9, wherein the split flag indicates whether the particular coding unit is split into the sub-units or is unsplit, and the skip flag indicates whether the particular coding unit is in skip mode or not in skip mode.

14. A computing device, comprising:

one or more processors; and a memory that includes a plurality of computer-executable components, the plurality of computer-executable components comprising:

an encoder component that encodes a quad-tree for a residue of an inter-coded unit or a intra-coded unit; and a flag coding component that, for a intra-coded unit, performs acts comprising:

combined coding coded block flag (CBF) values associated with color space components of the intra-coded unit using an adaptive technique when the inter-coded unit is not split into sub-units; and combined coding the CBF values associated with the color space components that belong to each unsplit sub-unit of the intra-coded unit when the intra-coded unit is split into sub-units.

15. The computing device of claim 14, wherein the combined coding the CBF values associate with the color space components that belong to each unsplit sub-unit further comprises:

when the inter-coded unit has one unsplit sub-unit, combined coding coded block flag (CBF) values of Y, U, and V components of the one unsplit sub-unit using the adaptive technique, the Y component is a luma component in a YUV color space, and the U and V components are chrominance components in the YUV color space;

when the intra-coded unit has two unsplit sub-units, combined coding a corresponding set of two CBF values belonging to each of the Y, U, and V components of the two unsplit sub-units without the adaptive technique;

when the intra-coded unit has three unsplit sub-units, combined coding a corresponding set of three CBF values belonging to each of the Y, U, and V components of the two unsplit sub-units without the adaptive technique; and when the intra-coded unit has four unsplit sub-units, combined coding at least a corresponding set of four CBF values belonging to the Y components of the four unsplit sub-units and combined code the set of two CBF values belong to a UV CBF root of the U and V components of the intra-coded unit using the adaptive technique.

16. The computing device of claim 15, further comprising, when the intra-coded unit has four unsplit sub-units, combined code another set of four CBF values belonging to the U components or the V components of the four unsplit sub-units when a CBF value of the U CBF root or a CBF value of the V CBF root is not zero.

17. The computing device of claim 15, wherein the combining coding performed for the two unsplit sub-units, the combined coding performed for the three unsplit sub-units, and the combined coding performed for the four unsplit sub-units are accomplished using different coding schemes.

18. The computing device of claim 14, wherein the flag coding component, for a inter-coded unit, performs acts comprising:

combined coding CBF values of a YUV CBF root of Y, U, and V components of the inter-coded unit using the adaptive technique;

encoding the CBF value of a U component or a V component belonging to the inter-coded unit separately when an additional corresponding U component or an additional corresponding V component in an upper layer to the layer that includes the inter-coded unit has a particular CBF value;

when the inter-coded unit includes one, two, or three unsplit sub-units, encoding the CBF values of the respective Y components of the inter-coded unit separately; and when the inter-coded unit includes four unsplit sub-units, combined coding the CBF values of the Y components of the four unsplit sub-units using the adaptive technique.

19. The computing device of claim 14, wherein the adaptive technique swaps a currently used coding value in a lookup table with a preceding coding value in the lookup table.

20. The computer-readable storage device of claim 1, wherein the lookup table includes values that correspond to at least one of forward prediction, backward prediction, or bi-prediction.

* * * * *